United States Patent
Anderson et al.

(10) Patent No.: US 11,821,530 B2
(45) Date of Patent: Nov. 21, 2023

(54) ACTIVE CHECK VALVE HAVING A MOVING MAGNET ACTUATOR

(71) Applicant: Waters Technologies Corporation, Milford, MA (US)

(72) Inventors: Sean Eric Anderson, Dedham, MA (US); Wade P. Leveille, Douglas, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 17/569,744

(22) Filed: Jan. 6, 2022

(65) Prior Publication Data

US 2022/0221074 A1 Jul. 14, 2022

Related U.S. Application Data

(60) Provisional application No. 63/136,063, filed on Jan. 11, 2021.

(51) Int. Cl.
*F16K 31/06* (2006.01)
*F16K 15/18* (2006.01)

(52) U.S. Cl.
CPC ...... *F16K 15/1843* (2021.08); *F16K 31/0665* (2013.01)

(58) Field of Classification Search
CPC ............... F16K 31/082; F16K 31/0651; F16K 31/0665; F16K 31/0679; F16K 15/1843; F16K 15/1823
See application file for complete search history.

(56) References Cited

U.S. PATENT DOCUMENTS 1,515,353 A * 11/1924 Martin ................ F16K 31/0665
251/76
1,674,914 A * 6/1928 Murray ............... F16K 31/0651
251/129.03

(Continued)

FOREIGN PATENT DOCUMENTS

DE 9308058 U1 8/1993
DE 102009015231 A1 10/2010
(Continued)

OTHER PUBLICATIONS

International Search Report and Written Opinion in PCT/US2022/011390 dated May 13, 2022.
(Continued)

*Primary Examiner* — Umashankar Venkatesan
(74) *Attorney, Agent, or Firm* — Schmeiser, Olsen & Watts LLP; William G. Guerin

(57) ABSTRACT

Described is an active check valve that uses electro-magnetic actuation for operation. The valve includes a plunger assembly having a magnet in a sealed internal volume. The plunger assembly further includes a plunger tip that extends from either a plunger assembly housing or a sealing member. Although the plunger assembly is disposed in the solvent flow, the magnet is not exposed to the solvent. When the valve is actuated, the plunger tip moves the sealing member to open or close the valve. Optionally, an arming force may be applied to the sealing member in advance of opening or closing to reduce the subsequent additional force necessary to move the sealing member during opening or closing, thereby improving the accuracy of the solvent composition in liquid chromatography system applications.

21 Claims, 9 Drawing Sheets

(56) References Cited

U.S. PATENT DOCUMENTS

| | | | | |
|---|---|---|---|---|
| 2,229,499 | A * | 1/1941 | Fisette | F16K 31/0665 |
| | | | | 188/112 R |
| 3,774,878 | A * | 11/1973 | Martinez | F16K 31/54 |
| | | | | 251/65 |
| 4,911,405 | A | 3/1990 | Weissgerber | |
| 5,135,027 | A * | 8/1992 | Miki | F16K 31/0637 |
| | | | | 137/596.17 |
| 5,494,258 | A | 2/1996 | Weissgerber et al. | |
| 5,605,317 | A | 2/1997 | Mealy et al. | |
| 7,511,475 | B2 * | 3/2009 | Maerky | F16K 37/0041 |
| | | | | 123/90.11 |
| 8,297,589 | B2 * | 10/2012 | Dourdeville | F04B 7/0076 |
| | | | | 251/129.01 |
| 8,833,732 | B2 * | 9/2014 | Heiko | B05C 5/0225 |
| | | | | 335/229 |
| 10,139,009 | B2 * | 11/2018 | Suzuki | F16K 31/0631 |
| 10,981,553 | B2 * | 4/2021 | Kam | B60T 8/176 |
| 11,383,686 | B2 * | 7/2022 | Stahr | F16K 31/08 |
| 2005/0092376 | A1 * | 5/2005 | Weber | F16K 31/0665 |
| | | | | 137/596.17 |
| 2006/0097209 | A1 * | 5/2006 | Barron | F16K 15/1823 |
| | | | | 251/129.15 |
| 2011/0073790 | A1 * | 3/2011 | Ko | H01F 7/1615 |
| | | | | 251/129.15 |
| 2015/0139840 | A1 * | 5/2015 | Lappan | F04C 14/24 |
| | | | | 418/16 |
| 2016/0305573 | A1 * | 10/2016 | Kowerchuk | F16K 15/1823 |
| 2016/0327176 | A1 * | 11/2016 | Nemoto | F16K 31/082 |
| 2018/0195533 | A1 * | 7/2018 | Bell | F15B 11/0413 |
| 2018/0313454 | A1 | 11/2018 | Imamura | |

FOREIGN PATENT DOCUMENTS

| | | |
|---|---|---|
| EP | 0328696 B1 | 12/1990 |
| EP | 0627584 B1 | 7/1997 |
| JP | H01247878 A | 10/1989 |
| JP | H06341561 A | 12/1994 |
| JP | 2001235052 A | 8/2001 |
| WO | 9525892 A2 | 9/1995 |
| WO | 2004113712 A2 | 12/2004 |
| WO | 2008147954 A1 | 12/2008 |
| WO | 2011081169 A1 | 7/2011 |

OTHER PUBLICATIONS

International Preliminary Report on Patentability in PCT/US2022/011390 dated Jul. 20, 2023.

* cited by examiner

ACTIVE CHECK VALVE HAVING A
MOVING MAGNET ACTUATOR

RELATED APPLICATION

This application claims the benefit of the earlier filing date of U.S. Provisional Patent Application Ser. No. 63/136,063, filed Jan. 11, 2021, and titled "Active Check Valve Having a Moving Magnet Actuator," the entirety of which is incorporated herein by reference.

FIELD OF THE INVENTION

The technology relates generally to check valves for pumps. More specifically, the technology relates to an active check valve using electro-magnetic actuation for opening and/or closing the valve. The check valve may be used, for example, in a liquid chromatography system.

BACKGROUND

In liquid chromatography systems, a piston positive displacement pump is often used to deliver precise flow to the system. Flow into an out of the pump head is directionally controlled using check valves which allow flow into the pump head during an intake stroke and out from the pump head during a delivery stroke. Under normal operation with liquid chromatography solvents, traditional ball-and-seat check valves may fail by getting stuck open or closed due to contamination from the solvents. The contaminating material can adhere the ball to the seat or obstruct the sealing region. A stuck-closed condition may arise from weak attraction or adhesion between the ball and the seat, due, for example, to electrostatic charging or to the presence of organic or inorganic residues or foreign matter in the solvent. This occurs predominantly on the intake side, where there is typically a lower pressure differential (e.g., a few tens of thousands of Pa) for opening the valve than on the outlet side which can take advantage of system pressure (a few MPa to tens of MPa or greater).

The chromatography mobile phase must be delivered with high volumetric precision. Reverse leakage of an inlet check valve degrades the performance of the pump by disturbing the relationship between piston displacement and the volume of delivered solvent. In some liquid chromatography systems having low-pressure solvent gradient proportioning capability, a gradient proportioning valve is used upstream from the pump. Such systems require only a single high-pressure pump to deliver a solvent mixture which may have a time-varying (gradient) solvent composition. The solvent mixture formed by the interaction of the pump intake stroke with cycling of the proportioning valve can be adversely affected by perturbations arising from degraded operation of the inlet check valve. Error in the solvent composition may occur from irreproducible opening or closing behavior of the inlet check valve or from solvent volume displacement arising from motion of the valve actuator.

Active check valves utilize an actuation mechanism during operation. For example, the mechanism may push a ball off its seat to overcome any adhesion to ensure the check valve opens. Many conventional actuation mechanisms require the use of dynamic seals to isolate the actuator components from the wetted path of the solvent. Dynamic seals can be sources of failure and can introduce artifacts to the solvent flow. For example, diaphragm or piston-style seals may exhibit pumping, which can disrupt the metering of solvents, resulting in the delivery of an incorrect solvent composition which can degrade the chromatographic measurement data.

SUMMARY

In one aspect, a check valve includes a valve body, a coil and a plunger assembly. The valve body has an inlet, an outlet, a flow path and a fluid channel disposed between the inlet and the outlet along the flow path. The coil is attached to the valve body and configured to generate a magnetic field in response to an electrical current. The plunger assembly is at least partially disposed within the coil and movable along the flow path between a closed position and an open position. The plunger assembly includes a plunger assembly housing, a magnet, a first sealing member and a plunger tip. The plunger assembly housing defines a sealed internal volume. The plunger assembly housing has a plunger axis that is coaxial with at least a portion of the flow path and has a plurality of channels defined along an outer surface and extending parallel to the plunger axis. The magnet is disposed in the sealed internal volume. The first sealing member is disposed inside the valve body along the fluid channel. The plunger tip extends along the plunger axis in a least a portion of a separation between the plunger assembly housing and the first sealing member and is configured to apply a force to the first sealing member.

The check valve may further include a second sealing member disposed in the valve body along the fluid channel and configured to engage the first sealing member to prevent a flow of liquid along the fluid channel when the plunger assembly is in the closed position.

The first sealing member may be a ball. The second sealing member may be a valve seat configured to receive the ball when the plunger assembly is in the closed position.

The plunger tip may be fixed at and end of the plunger assembly housing or may be fixed to the first sealing member.

The plunger assembly housing may include a first end cap, a second end cap and a side wall disposed between the first and second end caps. The channels may be formed in the side wall. The first and second end caps and the side wall may be joined together to form the sealed internal volume. The first and second end caps may be secured to the side wall by laser welds. The second end cap and the side wall may be formed as a single piece. The first end cap and the single piece may be joined together to form the sealed internal volume. The first end cap may be secured to the single piece by a laser weld.

The check valve may further include a bobbin attached to the valve body and wherein the coil is wound on the bobbin.

The check valve may further include a pole piece disposed in the sealed internal volume.

The coil may be a first coil configured to generate a first magnetic field and the check valve may further include a second coil attached to the valve body. The second coil being configured to generate a second magnetic field in response to an electrical current supplied to the second coil. The first and second magnetic fields may be in opposite directions.

In another aspect, a check valve includes a valve body, a valve seat, a sealing member, a coil and a plunger assembly. The valve body has an inlet, an outlet, a flow path and a fluid channel disposed between the inlet and the outlet along the flow path. The valve seat is disposed in the valve body along the fluid channel. The sealing member is disposed along the fluid channel proximate to the valve seat. The coil is attached to the valve body and is configured to generate a magnetic field in response to an electrical current. The plunger assembly is at least partially disposed within the coil and movable along the flow path between a closed position and an open position. The plunger assembly includes a plunger assembly housing, a magnet and a plunger tip. The plunger assembly housing has a plunger axis that is coaxial with at least a portion of the flow path has a plurality of channels defined along an outer surface and extending parallel to the plunger axis. The magnet is disposed inside the plunger housing assembly. The plunger tip extends along the plunger axis from one of the sealing member and an end of the plunger assembly housing. The plunger tip is configured to apply a force to the sealing member.

The sealing member may be a ball. The plunger tip may be fixed at an end of the plunger assembly housing or may be fixed to the sealing member.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

In brief overview, embodiments disclosed herein are directed to an active check valve that uses electro-magnetic actuation to open and/or close the check valve. The active check valve includes a valve body with an attached solenoid coil (or coils) that is used to actuate a plunger assembly having a permanent magnet. The plunger assembly is present within the flow path of the valve. When current is passed through the coil, the plunger assembly moves to an open position by pushing a sealing member to allow solvent to flow through the valve. For example, in a ball-and-seat check valve the plunger assembly applies a force to the ball to assist in opening the valve during fluid intake. The permanent magnet is hermetically-sealed within a housing of the plunger assembly and therefore avoids contact with the solvent flow.

Unlike other check valves using electro-magnetic actuation, the plunger assembly is separate from the ball and therefore the ball is free to move independently while not in contact with the plunger assembly. Preferably, an arming force is applied to the ball by the plunger assembly when the valve is in the closed position. Consequently, when the valve is actuated and the plunger assembly moves to the open position, there is no significant force applied to the ball that would otherwise occur on initial contact. Such impacts can cause disruptions in the solvent flow and may degrade the accuracy of the solvent composition. Moreover, sealing of the permanent magnet, pole pieces and other internal plunger assembly components inside the plunger assembly housing prevents these components from being in contact with any incompatible solvents. Advantageously, the active check valve can be used not only with liquid chromatography applications, but also to control flow for other liquid or gas applications.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

Figure 1:
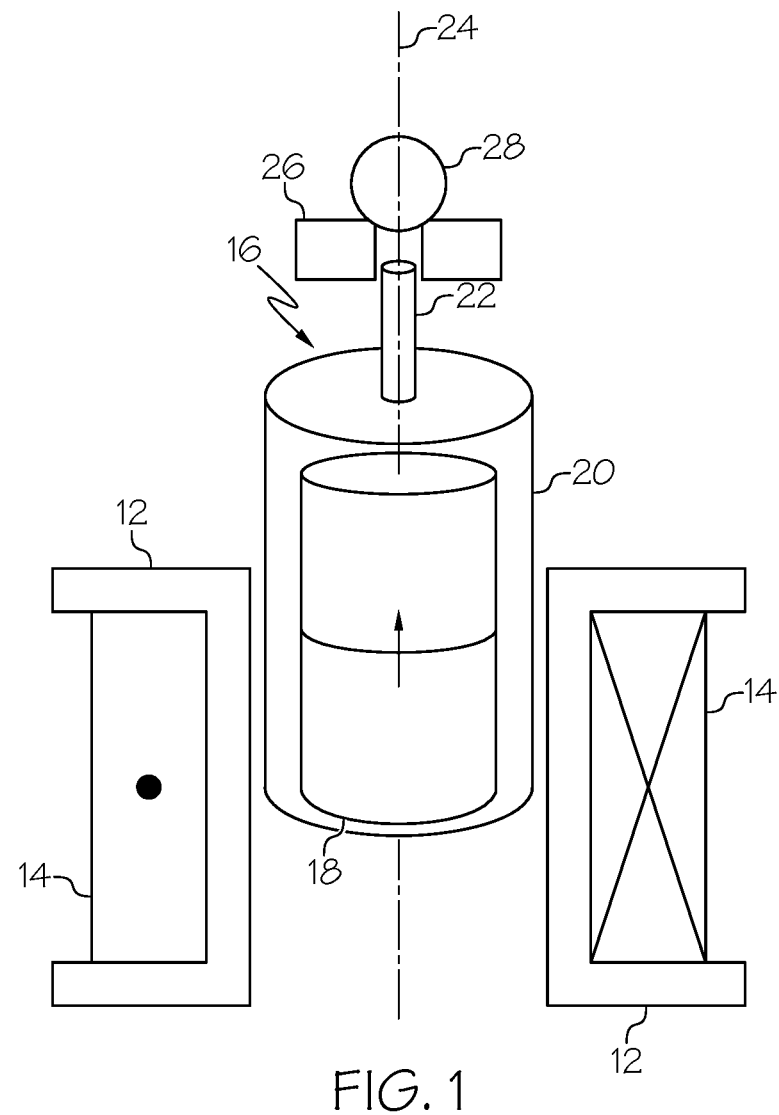
FIG. 1 is a schematic depiction of a portion of an embodiment of an active check valve having a single solenoid coil.

FIG. 1 is a schematic depiction of a portion of an embodiment of an active check valve having a ball and seat arrangement for opening and closing the valve. The valve includes a bobbin 12 (shown in cross-section) that is secured to a valve body (not shown). In one embodiment, the valve body is made of stainless steel. A single solenoid coil 14 is attached to the valve body by means of the bobbin 12 on which the coil 14 is wound. The active check valve also includes a plunger assembly 16 disposed at least partially inside the bobbin 12 and coil 14. The plunger assembly 16 may be substantially cylindrical in shape and includes a permanent magnet 18 enclosed in a plunger assembly housing 20. For example, the plunger magnet 18 may be a neodymium magnet and, in a non-limiting example, the magnet 18 may have a diameter of approximately 5 mm (3/16 inch) and a length of approximately 6 mm (1/4 inch). The plunger assembly 16 further includes a plunger tip 22 that is fixed to and extends from one end of the plunger assembly housing 20. The plunger assembly 16 may also include one or more pole pieces (not shown) having a high magnetic permeability for concentrating magnetic flux, leading to improvement in the efficiency of valve actuation. Pole pieces made from materials, such as iron-nickel alloys or ferritic stainless steels, can guide and concentrate the magnetic flux to thereby increase the force response of the plunger assembly 16 or bias the plunger assembly 16 in a desired direction.

The "X" and "•" shown on the coil 14 indicate a winding direction into and out from the figure, respectively. If a reverse winding direction is used, the electrical current can be reversed to achieve a same direction of movement of the plunger assembly 16. Movement is possible in either direction if the direction of the current is reversible. Control of the electrical current for actuation of the valve can take on different forms. In some non-limiting examples, a pulsewidth voltage modulator or DC controller is used to achieve the desired current level for the coil 14.

Conventional active check valves using electro-magnetic actuation include magnets that are exposed to the solvent flow. Often such check valves use nickel or nickel plating on the magnet; however, such materials may provide insufficient protection against harsh solvents that may cause corrosion or cause the nickel to leach into the solvent. The plunger assembly 16 in the illustrated embodiment is a sealed unit which prevents solvent flowing past the plunger assembly 16 along the outer surface of the plunger assembly housing 20 from coming into contact with the magnet 18, pole pieces and any other internal components. In some embodiments the plunger assembly housing 20 and plunger tip 22 are made of titanium. Preferably, the plunger tip 22 has a diameter that limits any deflection from the axis of the flow path 24. As used herein, "flow path" means a path along which a solvent flows through a check valve. The flow path may be a linear path extending between the inlet and outlet. Alternatively, the flow path may include one or more bends in the direction of solvent flow such that a portion of the flow path may not be colinear with another portion of the flow path. In a non-limiting example, the plunger assembly housing 20 has an outer diameter of approximately 5.5 mm (0.217 inch) and the plunger tip 22 has a diameter of approximately 0.6 mm (0.025 inch).

As shown in the figure, the active check valve is in a closed state. The plunger tip 22 may extend into the second sealing member (i.e., valve seat 26) but does not contact the ball 28. When the valve is switched to the open position, the plunger assembly 16 moves upward in the figure and pushes the ball 28 off the valve seat 26 to enable liquid to flow through the valve. In some non-limiting examples, the ball 28 is a ruby or sapphire ball and the valve seat 26 is a conical surface of ruby or sapphire to achieve sufficient hardness and chemical resistance. In alternative examples, the ball 28 may be a ceramic or metallic ball and the valve seat 26 may be a ceramic or metallic seat. In yet another example, the valve seat 26 is a tri-point seat in which two concave spherical surfaces of different radii are used instead of a conical surface.

In one non-limiting example, the opening in the valve seat 26 may have a diameter in a range of approximately 1.0 mm to 1.3 mm (0.04 inch to 0.05 inch) and the diameter of the ball 28 is approximately 1.75 mm (0.07 inch) although, in other non-limiting examples, the diameter of the ball 28 may be in a range from approximately 1.6 mm (1/16 inch) to 6.4 mm (1/4 inch).

During operation as an inlet check valve, the ball 28 is pushed and held against the valve seat 26 by the high fluid pressure inside the pump piston, thereby sealing (i.e., blocking) the fluid channel through the valve body. In some embodiments, an arming motion of the plunger assembly 16 is implemented by supplying an electrical current to the coil 14 so that a weak force is applied to the ball 28 prior to the displacement of the ball 28 from the valve seat 26. This arming force is insufficient to move the ball 28 off the valve seat 26 while the solvent in the pump chamber is at high pressure during a delivery stroke. U.S. Pat. No. 8,297,589, incorporated herein by reference, describes examples of how an arming signal may be applied in a check valve. Normally, when the pump initiates an intake stroke, a vacuum sufficient to pull the ball off the seat occurs. If anything causes the ball 28 to stick to the valve seat 26, the additional force applied by the plunger tip 22 as the electrical current to the coil 14 is increased is sufficient to overcome the stiction force. Advantageously, using an arming force at a lower current magnitude prevents the occurrence of a large impact that can otherwise occur when the plunger tip 22 first contacts the ball 28 upon actuation at full electrical current. In addition, the distance that the plunger assembly 16 travels when switching from the closed to open state is substantially reduced, resulting in an improvement in timing response and repeatability. Moreover, because the plunger tip 22 is not attached to the ball 28, the total mass of the plunger assembly 16 is less. In some implementations, the magnitude of the electrical current supplied to the coil 14 is reduced to a lower level after the ball 28 moves off the valve seat 26 to reduce the resistive heating.

The arming force and subsequent actuation pushing are synchronized with each pump cycle, that is, time required for a full intake stroke followed by a full delivery stroke. Upon initiation of each intake stroke, the plunger assembly 16 moves in a forward direction pushing the ball 18 off the valve seat 26 and upon initiation of each delivery stroke, the plunger assembly 16 reverses direction and moves away from the ball 28 to allow the ball 28 to move back into the valve seat 26.

Figure 2:
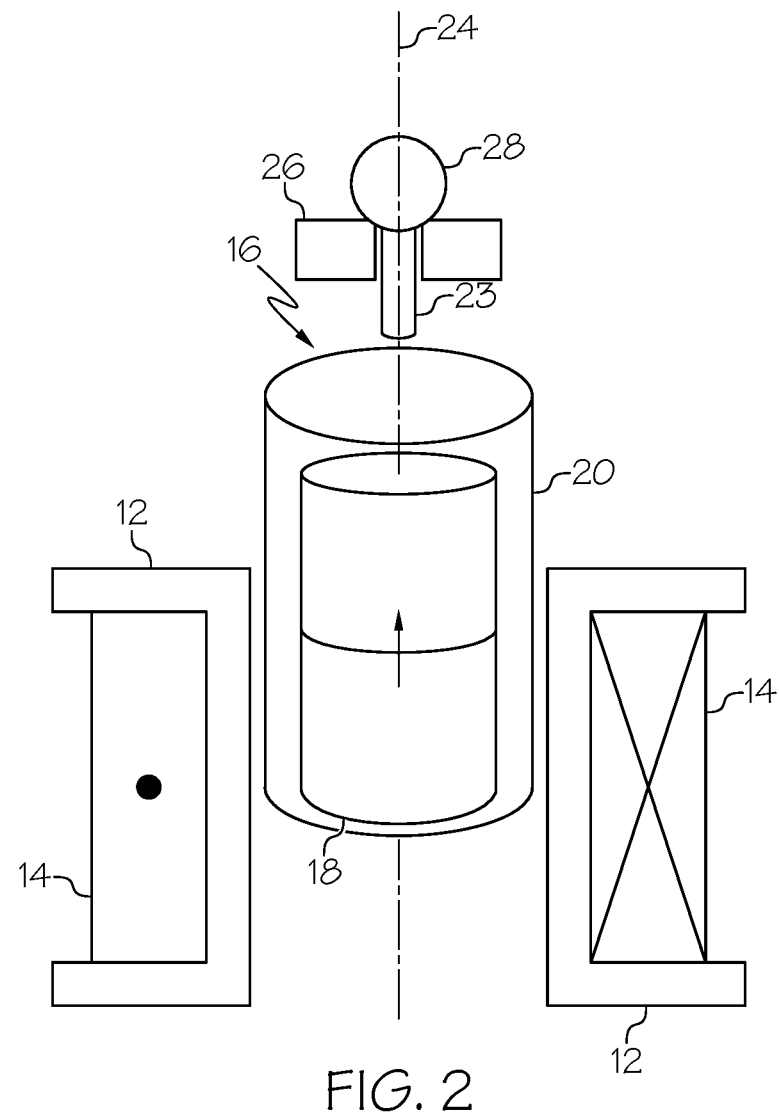
FIG. 2 is a schematic depiction of a portion of another embodiment of an active check valve having a single solenoid coil.

In an alternative embodiment shown in FIG. 2, there is no plunger tip extending from an end of the plunger assembly housing 20 into a separation between the housing 20 and the ball 28. Instead, a plunger tip 23 is fixed to and extends from the ball 28 nominally along the plunger axis. The ball 28 and plunger tip 23 can be formed as an integral unit from the same material. Alternatively, the plunger tip 23 may be fabricated separately and secured to the ball 28. For example, one end of the plunger tip 23 may be secured inside a radial bore in the ball 28. In variations of this embodiment, the plunger tip 23 may extend outward from a poppet or other form of sealing member.

When the valve is in the illustrated closed position with the ball 28 held against the valve seat 26, the plunger tip 23 extends through the valve seat 26 and into the region above the plunger assembly 16 without making contact (unless armed). During activation of the valve to the open position, the plunger assembly 16 moves toward the valve seat 26 and pushes the plunger tip 23. As a result, the ball 28 is moved off the valve seat 26 to thereby enable solvent to flow through the valve. Advantageously, the plunger tip 23 and ball 28 are able to rotate within a limited range with respect to the valve seat 26 during operation so that the buildup of salts or other contaminants is reduced or eliminated.

Figure 3:
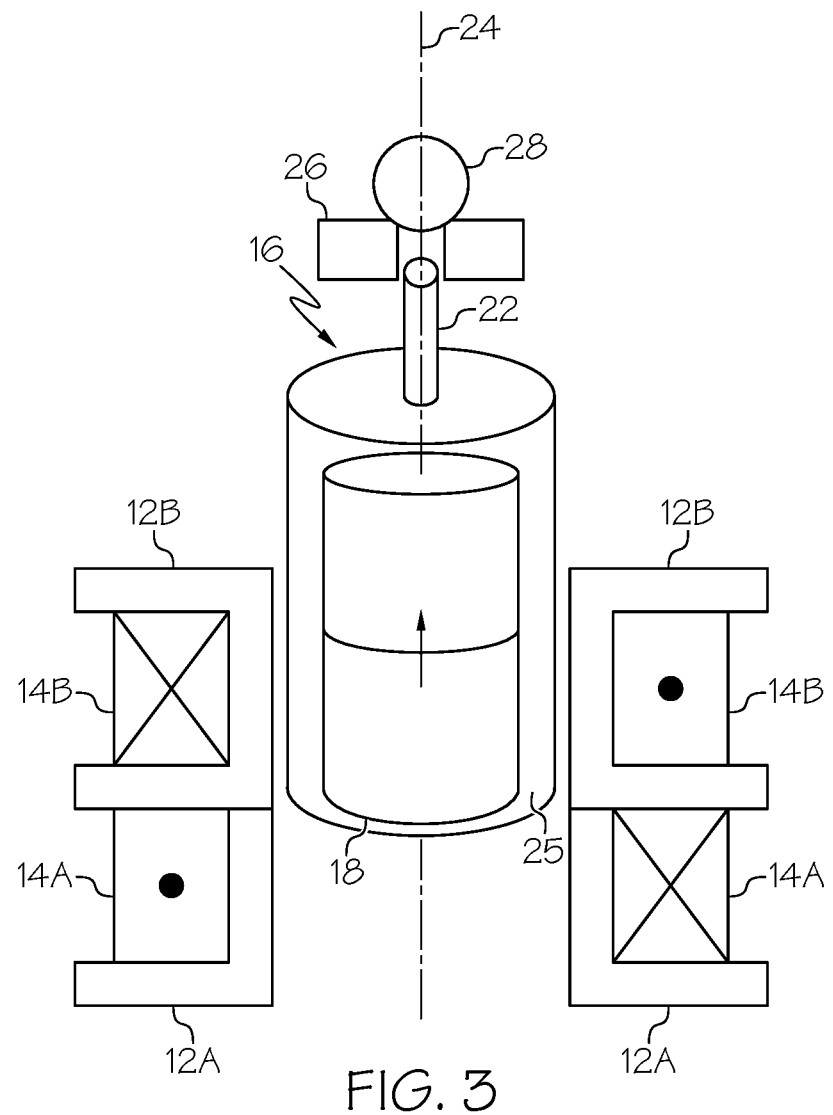
FIG. 3 is a schematic depiction of a portion of an embodiment of an active check valve having a dual solenoid coil arrangement.

FIG. 3 is a schematic depiction of a portion of an alternative embodiment of an active check valve in which a twin coil arrangement is used. The illustrated components are similar to those depicted in FIG. 1; however, a first bobbin 12A having a first solenoid coil 14A wound in one direction and a second bobbin 12B having a second solenoid coil 14B wound in the opposite direction are included. In a modified version, the two bobbins 12 may be integrated as a single unit having the two oppositely-wound coils 14. The plunger assembly 16 is centered along the flow path 24 between two oppositely-wound solenoid coils 14. In one non-limiting example, the magnet 18 used for the twin coil arrangement has a diameter of approximately 3.2 mm (1/8 inch) and a length of approximately 6 mm (1/4 inch). The magnetic fields from the two coils 14 are generated in opposite directions; however, interaction of the fields with opposite poles result in forces on the permanent magnet 18 that are applied in the same direction. Thus, the twin coil configuration is more efficient in the conversion of electrical power to force, allowing for smaller magnets to be used with the resulting benefits of less inertia (less wear), less inertial pumping and a more compact form factor. Consequently, a narrower plunger assembly housing 25 is possible. In a non-limiting example, the plunger assembly housing 25 has an outer diameter of approximately 4.3 mm (0.170 inch).

Referring again to FIG. 1, if the plunger assembly 16 were instead centered within the solenoid coil 14, the magnetic field generated by the coil 14 acting on both ends of the permanent magnet 18 results in equal and opposite forces. Consequently, the forces would cancel and no movement of the plunger assembly 16 would occur. Thus, in the single-coil configuration, the plunger assembly 16 is biased asymmetrically in the axial direction so that a net force is imposed on the magnet 18 by the magnetic field. More specifically, the end of the magnet 18 inside the coil 14 has a stronger interaction with the magnetic field than the other end of the magnet 18, resulting in a net force that moves the plunger assembly 16 along the flow path 24.

The force applied by the plunger assembly 16 is sufficiently scaled to enable the active check valve to be opened even in the presence of an adhesive force that increases the effective cracking pressure by tenths of MPa to several MPa. The plunger assembly 16 is entirely contained within the flow path, therefore the check valve is sealed using only static seals. Consequently, there is not change in fluid volume due to plunger actuation that would otherwise introduce pumping artifacts manifested as metering error resulting in an error in the solvent composition. Such errors can occur in active check valves employing dynamic seals.

Figure 4A:
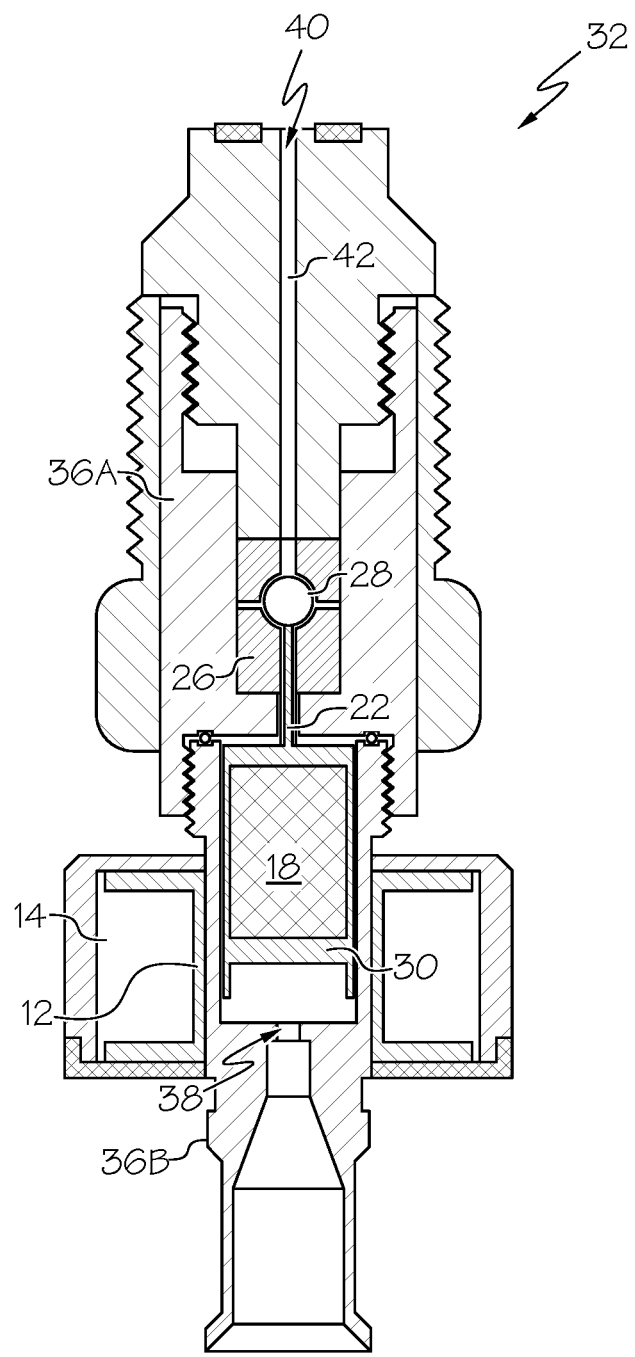
FIGS. 4A and 4B are cross-sectional and perspective cross-sectional views, respectively, of an embodiment of a single coil active check valve.
Figure 4B:
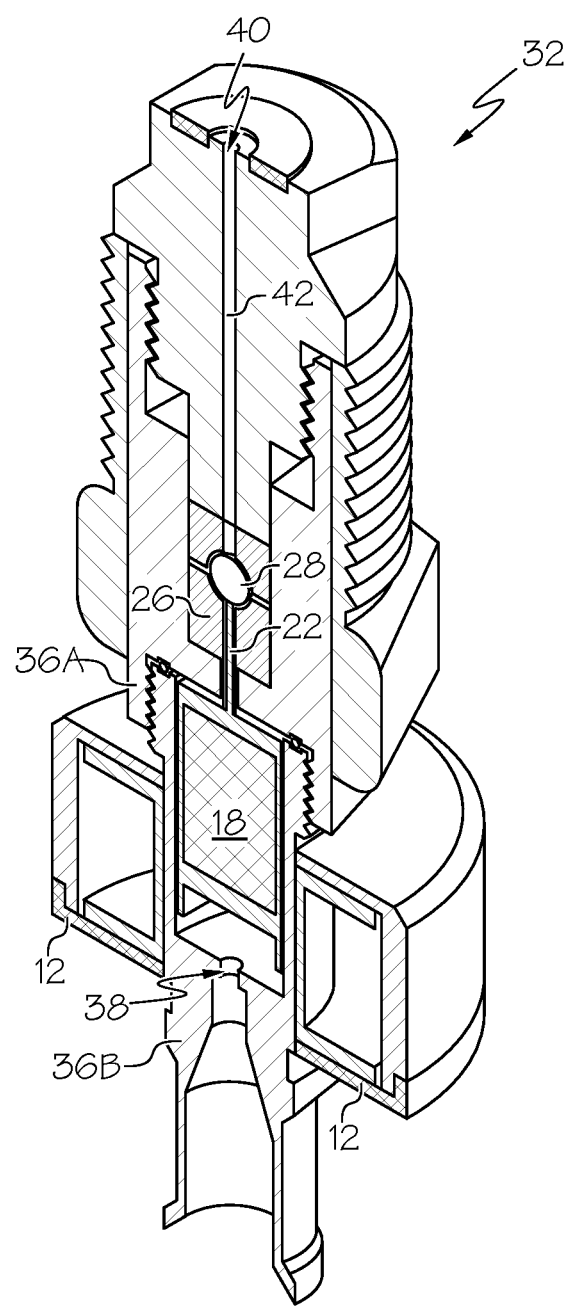
Figure 5A:
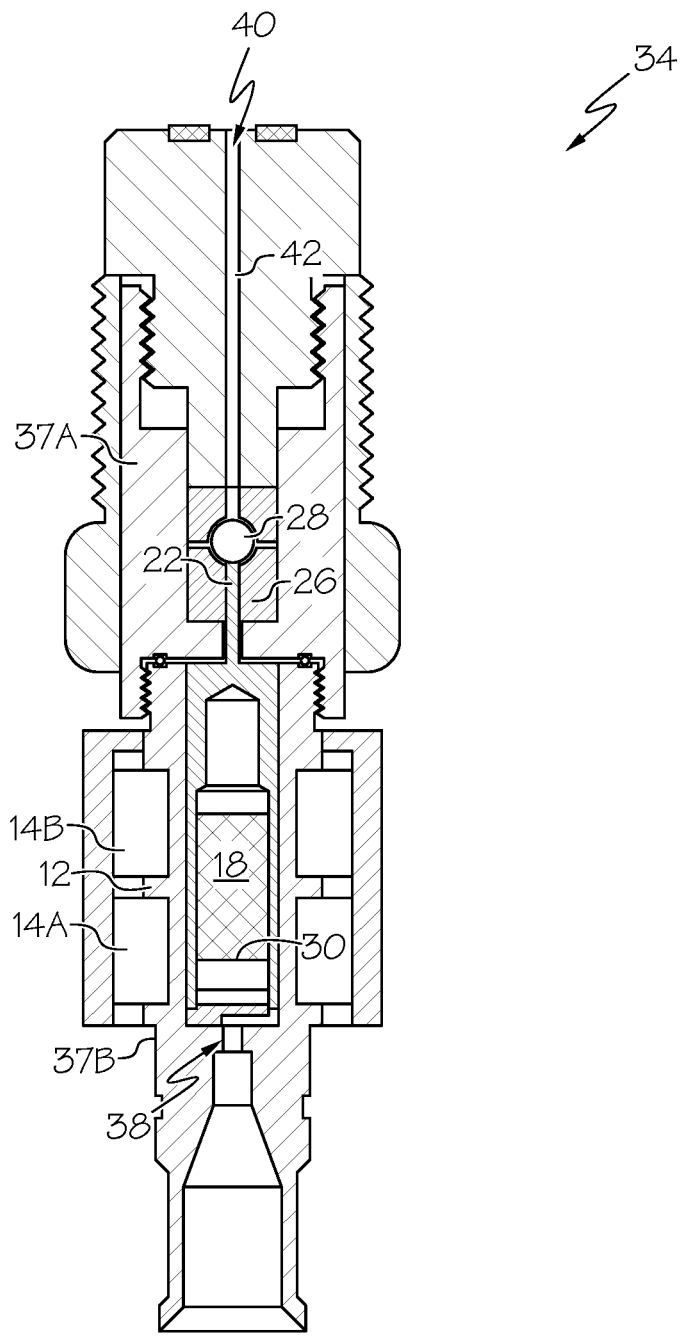
FIGS. 5A and 5B are cross-sectional and perspective cross-sectional views, respectively, of a dual coil active check valve.
Figure 5B:
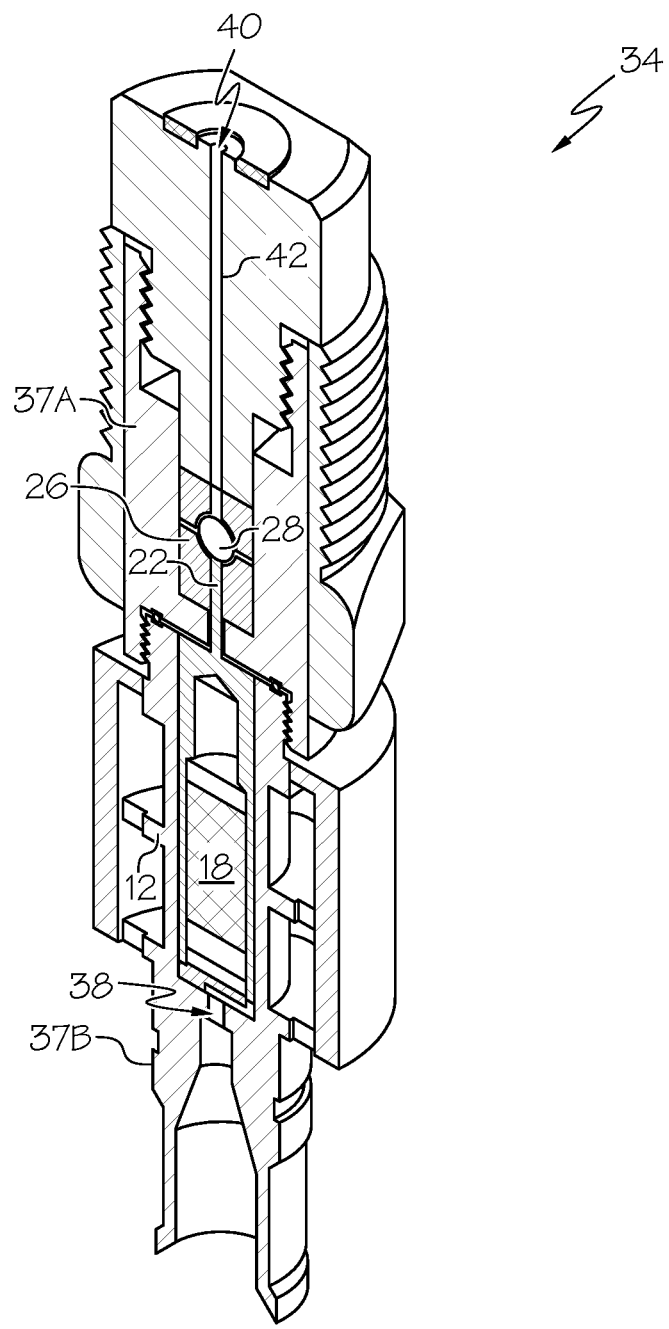

FIGS. 4A and 4B are cross-sectional and perspective cross-sectional views, respectively, of an embodiment of a single coil active check valve 32 constructed in accordance with the schematic configuration of FIG. 1. FIGS. 5A and 5B are cross-sectional and perspective cross-sectional views, respectively, of a dual coil active check valve 34 constructed in accordance with the schematic configuration of FIG. 3. Referring to both embodiments, each valve 32 or 34 includes a valve body 36 or 37, respectively, which may be formed of multiple body members (e.g., in FIGS. 4A and 4B body segment 36A which encloses the plunger assembly 16 and body segment 36B which encloses the ball 28 and valve seat 26) secured together to define a single body structure. The valve body 36 or 37 includes an inlet 38 to receive a liquid, an outlet 40 to dispense the liquid when the valve 32 or 34 is in the open state, and a fluid channel 42 extending from the inlet 38 to the outlet 40 along the flow path. The valve body 36 may had a threaded portion to enable it to be attached to a pump head or other assembly. By way of non-limiting examples of numerical values, the axial length of each valve body 36 may be from approximately 35 mm to approximately 50 mm and the diameter may be approximately 12 mm.

For each valve 32 or 34, in addition to the permanent magnet 18, the plunger assembly 16 includes a pole piece 30 of high permeability material and may further include a disk spring and/or an O-ring (not shown) to maintain stable position of the magnet 18 and pole piece 30 within the sealed internal chamber of the plunger assembly housing 20.

Figure 6:
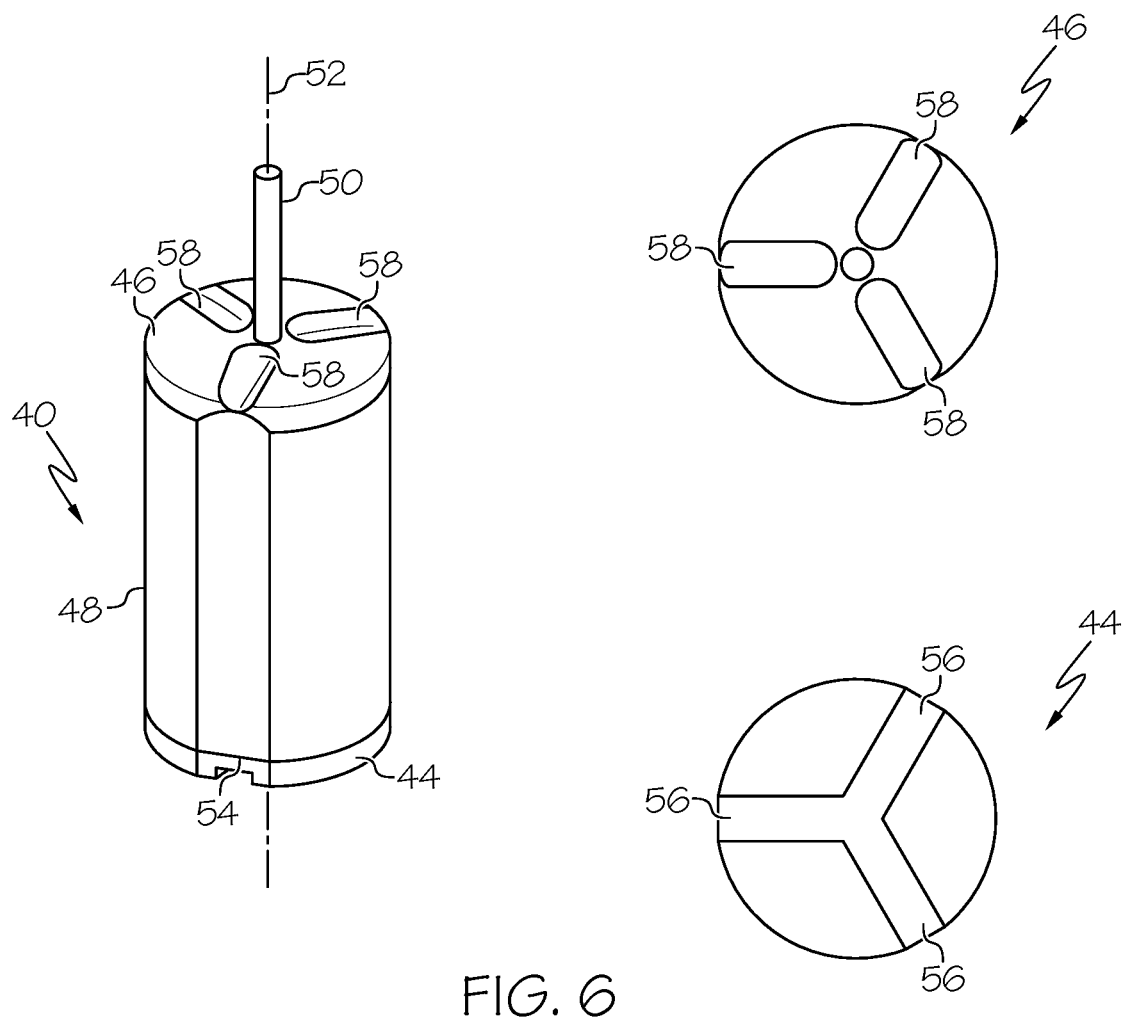
FIG. 6 shows an example of a plunger assembly for use with a single coil active check valve.

An example of a plunger assembly 40 for use with a single coil active check valve is shown in FIG. 6. The plunger assembly 40 includes a plunger assembly housing having a first end cap 44, a second end cap 46 and a side wall 48. The side wall 48 is substantially in the shape of a hollow cylindrical body. In some implementations, the second end cap 46 and the side wall 48 may be formed as a single piece. A plunger tip 50 extends from the second wall 46 along a plunger axis 52 which is coaxial with the flow path. Three channels 54 are formed in the outer surface of the side wall 48 to assist in the flow of liquid past the plunger assembly 40 and reduce undesired pumping effects when the valve is actuated. In addition, the first end cap 44 includes three radial channels 56 and the second end cap 46 includes three radial channels 58 to further assist the flow of liquid past the plunger assembly 40. In other embodiments, the shapes of the walls 44 and 46 and the side wall 48 may be different and the number of channels may be different. In some embodiments, the first and second end caps 44 and 46 are secured to the side wall 48 using laser welding to create a sealed internal volume which prevents solvent from contacting the permanent magnet and any other enclosed components. In some other embodiments, the first end cap 44 and the single piece defined by the second end cap 46 and side wall 48 are secured together by a laser weld. In alternative embodiments, the sealed internal volume may be formed by other means, for example, using a press fit, tapered thread, gasket, O-ring, adhesive sealant or diffusion bond.

Figure 7:
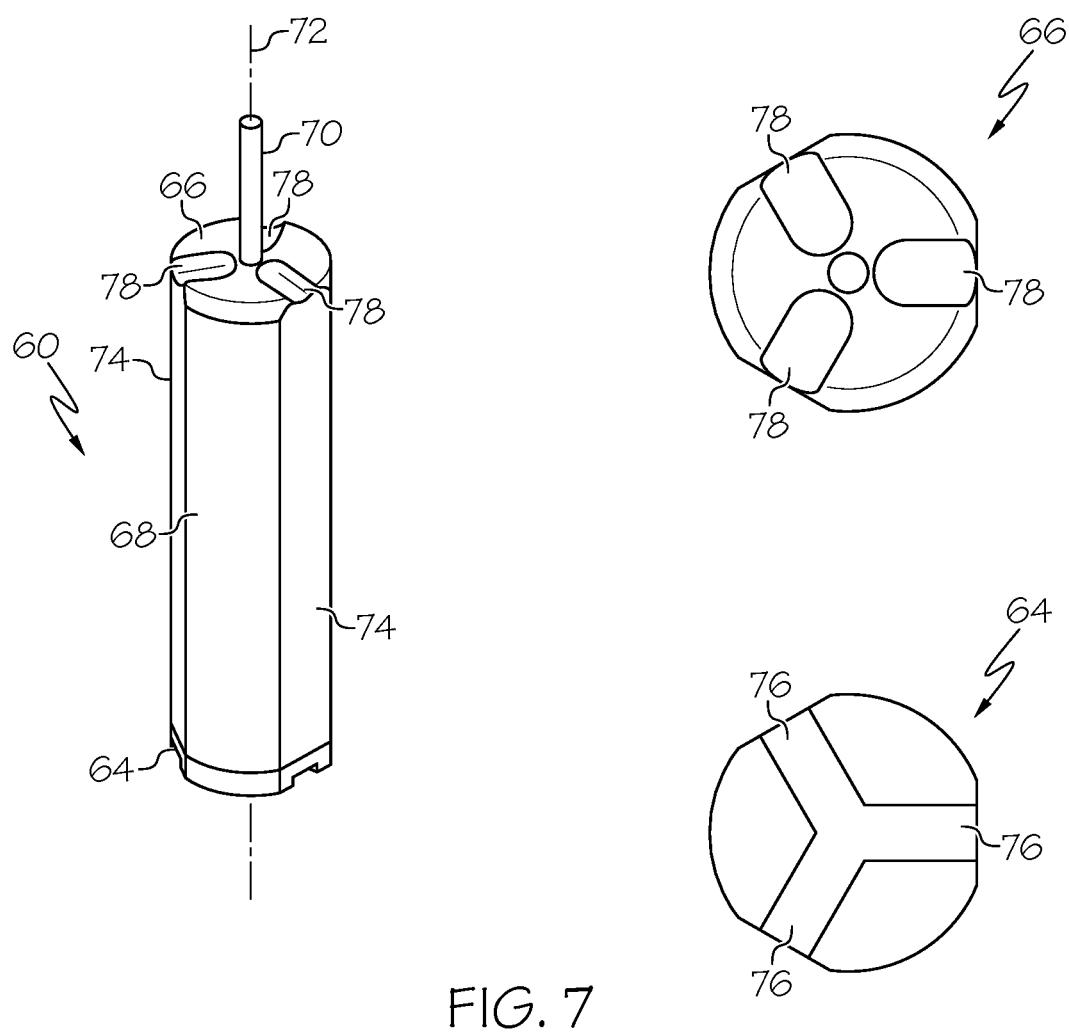
FIG. 7 shows an example of a plunger assembly for use with a dual coil active check valve.

An example of a plunger assembly 60 for use with a dual coil active check valve is shown in FIG. 7. The plunger assembly 60 includes a plunger assembly housing comprised of a first end cap 64, a second end cap 66 and a side wall 68. The diameter of the side wall 68 may be substantially less than the diameter of the counterpart side wall 48 in FIG. 6 due to the increased magnetic field strength achievable with the dual coil configuration which allows for a smaller permanent magnet to achieve the same plunger force. The plunger tip 70 extends from the second wall 66 along the plunger axis 72. Similar to the prior example, channels 74 are formed in the outer surface of the side wall 68 to assist in the flow of liquid past the plunger assembly 60 when the valve is in an open state and the end caps 64 and 66 include radial channels 76 and 78 to further assist the flow of liquid past the plunger assembly 60. The plunger assembly 60 may be constructed to create a sealed internal volume using techniques similar to those described above with respect to the plunger assembly 40 of FIG. 6.

Referring now to both the examples shown in FIG. 6 and FIG. 7, the sealed internal volume inside the plunger assembly housing and the thickness of the side wall 48, 68 results in a small overall size of the plunger assembly 40, 60. This small size enables a smaller radial separation between the coil and permanent magnet 18. As a result, a correspondingly greater force is applied to the plunger assembly 40, 60 during valve actuation. The diameter of the sealed internal volume and the thickness of the side wall 48, 68 are preferably made as small as practical using standard manufacturing techniques and should account for manufacturing variability on the magnet diameter and the thickness tolerance for nickel-plating of the magnet 18. The end caps 44 and 46, 64 and 66 of the plunger assembly 40, 60 are used as hard-stops to control the total travel of the ball 28 and the plunger assembly 40, 60. To reduce impact and wear, energy absorbing material may be used on one or both of the end caps 44 and/or 46, 64 and/or 66. Alternatively, or in addition, energy absorbing material may be used on the surfaces of the valve body that make contact with the end caps 44 and 46, 64 and 66. In some alternative embodiments, the shape of the outer surface of the side wall 48, 68 where the solvent passes by may have a different shape such as channels having different curvatures or channels formed as flat regions on the outer surface.

The performance of an active check valve can be indirectly measured by measuring the compositional accuracy of a liquid chromatography pump utilizing the valve. Measurements were made for a liquid chromatography pump used to supply a solvent having a gradient composition to a detector. The composition included two aqueous solutions where one of the solutions included a tracer compound. An active check valve having a single coil actuator was used and the results compared to measurement data obtained using a passive check valve. Measurement data acquired using the active check valve did not exhibit any artifacts that were significantly different from those obtained from measurements made using the passive check valve. Thus, the performance of the active check valve has substantially equivalent performance to the passive check valve.

Although the examples of active check valves described above are based primarily on a ball and valve configuration, it should be recognized that the principles described herein are applicable to other valve configurations. For example, other types of sealing members may be used to engage and disengage from each other to prevent and enable the flow of liquid through the valve wherein one of the sealing members is moved by the plunger tip upon electro-magnetic actuation. In another example, an active valve may include a plunger assembly having two plunger tips wherein each plunger tip extends from an end of a plunger assembly housing that is opposite to the other plunger tip. An active shuttle valve can be made with such a plunger assembly by using reversible electro-magnetic actuation such that the plunger assembly can be reliably moved in opposite directions along the flow path.

While various examples have been shown and described, the description is intended to be exemplary, rather than limiting and it should be understood by those of ordinary skill in the art that various changes in form and detail may be made therein without departing from the scope of the invention as recited in the accompanying claims.

The invention claimed is:

1. A check valve, comprising:
   a valve body having an inlet, an outlet, a flow path and a fluid channel disposed between the inlet and the outlet along the flow path;
   a coil attached to the valve body and configured to generate a magnetic field in response to an electrical current; and
   a plunger assembly at least partially disposed within the coil and movable along the flow path between a closed position and an open position, the plunger assembly comprising:
      a plunger assembly housing defining a hermetically-sealed internal volume, the plunger assembly housing having a plunger axis coaxial with at least a portion of the flow path and comprising a first end cap, a second end cap and a side wall disposed between the first and second end caps, the side wall having a plurality of channels extending parallel to the plunger axis, at least one of the first and second end caps having a plurality of radial channels in communication with a respective one of the channels in the side wall;
      a magnet disposed in the hermetically-sealed internal volume, whereby a solvent in the flow path is prevented from contacting the magnet;
      a first sealing member disposed inside the valve body along the fluid channel; and
      a plunger tip extending along the plunger axis in at least a portion of a separation between the plunger assembly housing and the first sealing member, the plunger tip configured to apply a force to the first sealing member.

2. The check valve of claim 1 further comprising a second sealing member disposed in the valve body along the fluid channel and configured to engage the first sealing member to prevent a flow of liquid along the fluid channel when the plunger assembly is in the closed position.

3. The check valve of claim 1 wherein the first sealing member is a ball.

4. The check valve of claim 3 wherein the second sealing member is a valve seat configured to receive the ball when the plunger assembly is in the closed position.

5. The check valve of claim 1 wherein the plunger tip is fixed at an end of the plunger assembly housing.

6. The check valve of claim 1 wherein the plunger tip is fixed to the first sealing member.

7. The check valve of claim 1 wherein the second end cap and the side wall are formed as a single piece.

8. The check valve of claim 7 wherein the first end cap and the single piece are joined together to form the hermetically-sealed internal volume.

9. The check valve of claim 8 wherein the first end cap is secured to the single piece by a laser weld.

10. The check valve of claim 1 wherein the first and second end caps and the side wall are joined together to form the hermetically-sealed internal volume.

11. The check valve of claim 10 wherein the first and second end caps are secured to the side wall by laser welds.

12. The check valve of claim 1 further comprising a bobbin attached to the valve body and wherein the coil is wound on the bobbin.

13. The check valve of claim 12 wherein the fluid channel passes through the bobbin.

14. The check valve of claim 1 wherein the coil is a first coil configured to generate a first magnetic field, the check valve further comprising a second coil attached to the valve body and configured to generate a second magnetic field in response to an electrical current supplied to the second coil.

15. The check valve of claim 14 wherein the first and second magnetic fields are in opposite directions.

16. The check valve of claim 1 further comprising a pole piece disposed in the hermetically-sealed internal volume.

17. A check valve, comprising:
   a valve body having an inlet, an outlet, a flow path and a fluid channel disposed between the inlet and the outlet along the flow path;
   a valve seat disposed in the valve body along the fluid channel;
   a sealing member disposed along the fluid channel proximate to the valve seat;
   a coil attached to the valve body and arranged coaxial with at least a portion of the fluid channel, the coil configured to generate a magnetic field in response to an electrical current;
   a plunger assembly at least partially disposed within the coil and movable along the flow path between a closed position and an open position, the plunger assembly comprising:
      a plunger assembly housing defining a hermetically-sealed internal volume and having a plunger axis coaxial with at least a portion of the flow path, the plunger assembly housing having a plurality of channels defined along an outer surface and extending parallel to the plunger axis;
      a magnet disposed inside the plunger assembly housing, whereby a solvent in the flow path is prevented from contacting the magnet; and
      a plunger tip extending along the plunger axis from one of the sealing member and an end of the plunger assembly housing, the plunger tip configured to apply a force to the sealing member.

18. The check valve of claim 17 wherein the sealing member is a ball.

19. The check valve of claim 17 wherein the plunger tip is fixed at an end of the plunger assembly housing.

20. The check valve of claim 17 wherein the plunger tip is fixed to the sealing member.

21. The check valve of claim 17 further comprising a bobbin attached to the valve body, wherein the coil is wound on the bobbin and wherein the fluid channel passes through the bobbin.

* * * * *